June 9, 1964     F. F. KLEIN, JR     3,136,149
BICYCLE LOCK
Filed Oct. 20, 1961
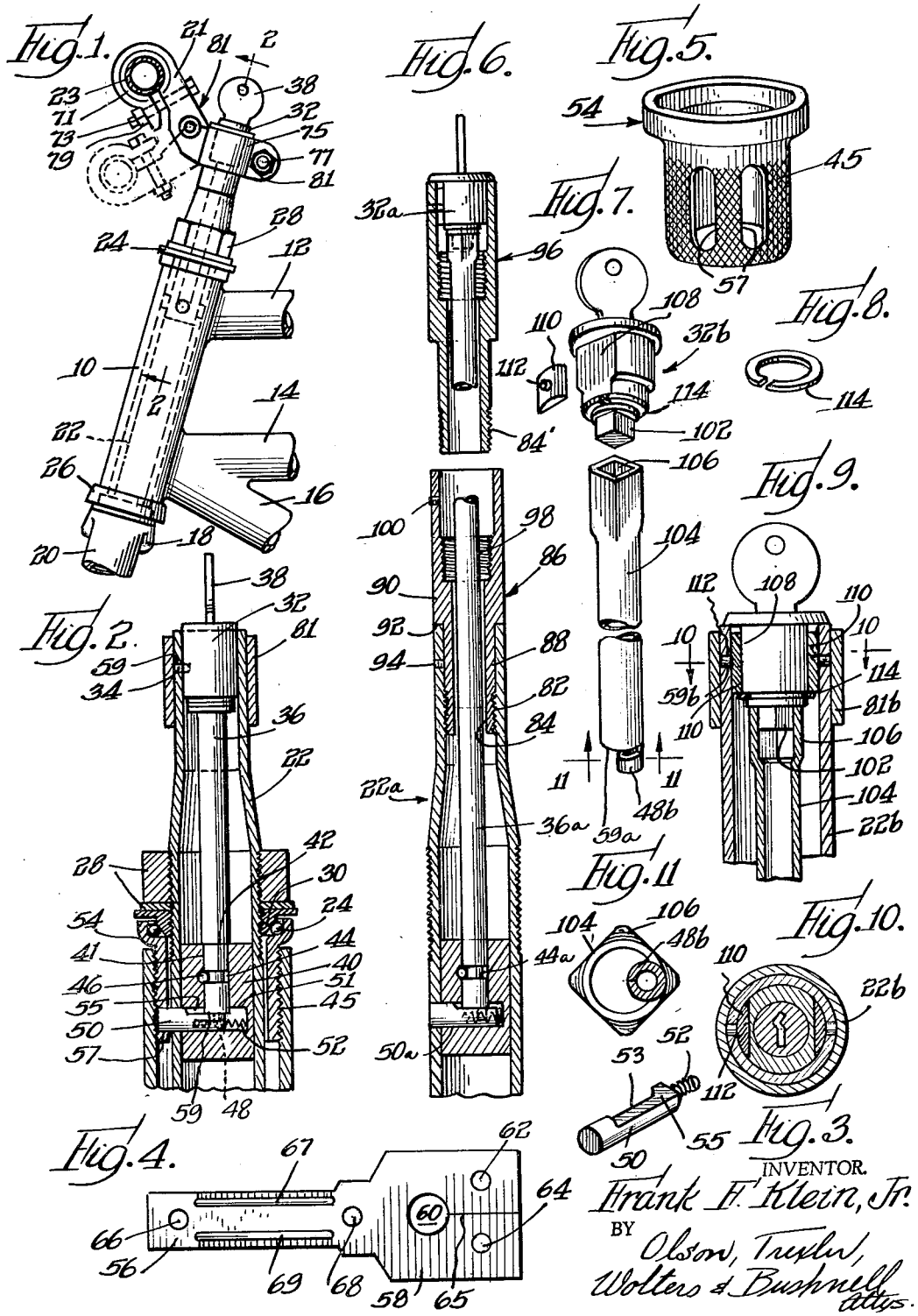
INVENTOR.
Frank F. Klein, Jr.
BY Olson, Trexler, Wolters & Bushnell
Attys.

United States Patent Office 3,136,149
Patented June 9, 1964

3,136,149
BICYCLE LOCK
Frank F. Klein, Jr., 2049 W. 63rd St., Chicago, Ill.
Filed Oct. 20, 1961, Ser. No. 146,581
8 Claims. (Cl. 70—187)

This invention relates to a locking device for tubular frame vehicles and more particularly to a steering lock for cycles and the like.

Many varieties of cycle locks have been provided heretofore. One of the most effective varieties has been the steering lock, which locks the front wheel against turning movement. When in locked position, the fork stem or steering post is rotationally keyed to the head portion of the cycle's tubular frame by the locking mechanism. Locks of this variety have generally projected laterally through the tubular head portion or have been located inconveniently for operational purposes as at the base of the fork stem. These locks have not generally been designed to facilitate replacement and use as optional cycle equipment. Furthermore, steering assemblies incorporating these locks have generally been provided with uneconomical handle bar holding means.

Accordingly, it is an object of this invention to provide a steering lock for tubular frame vehicles as cycles and the like that is of economical construction.

Another object of this invention is to provide a steering assembly for bicycles or other tubular frame vehicles that incorporates locking means and is of economical construction.

It is a further object of this invention to provide a conveniently serviceable and replaceable steering lock for cycles and the like.

A still further object of this invention is to provide a steering lock for cycles that is located in the position most convenient for operational purposes.

It is still another object of this invention to provide a steering assembly for cycles that can be conveniently provided with an optional built-in steering lock.

It is a more specific object of this invention to provide an economical steering lock that can lock the steering wheel of a cycle or the like in any of a plurality of positions relative to the cycle frame.

Yet another object of this invention is to provide a bicycle lock in connection with structure whereby the handlebars can be raised quite substantially in height.

Other objects and advantages of the present invention will become apparent from the accompanying drawings and the following description and claims.

In the drawings, FIG. 1 shows a portion of a typical tubular frame bicycle incorporating the features of the present invention;

FIG. 2 is a cross sectional view partially in section showing the locking mechanisms of the present invention in greater detail and taken substantially along line 2—2 of FIG. 1;

FIG. 3 is a cut away perspective view of the locking bolt of the present invention;

FIG. 4 is a plan view of a flat sheet metal part that is to be bent into handlebar holding means for the steering post;

FIG. 5 is a perspective view of the bearing cup;

FIG. 6 is a vertical sectional view showing extension or elevator means for the handlebars;

FIG. 7 is an exploded perspective view of a modification of certain of the locking parts;

FIG. 8 is a perspective view of a retaining ring used with the parts of FIG. 7;

FIG. 9 is a vertical sectional view showing the parts of FIG. 7 in operating position;

FIG. 10 is a horizontal cross sectional view along the line 10—10 in FIG. 9; and FIG. 11 is an upward, horizontal cross sectional view along the line 11—11 in FIG. 7.

Referring now more specifically to the detailed features of the drawings, FIG. 1 shows a substantially upright tubular portion 10, known as the head portion of a tubular bicycle frame. Fixedly attached to the head portion 10 are further tubular frame portions 12, 14, and 16. The upper and lower ends of the head 10 are provided with suitable annular bearing means 24 and 26 respectively. A concentric tubular stem portion 22 extends through the head 10 and is rotatably mounted therein through the bearing means at 24 and 26. The stem portion 22 terminates at its lower end in a fork portion 18 and 20 rotatably carrying the front wheel of the cycle. The stem is threaded in the region adjacent the top bearing 24 to receive nuts 28 and an adjustable bearing cone 30. The stem 22 above the threads is tapered to a smaller diameter and has a handlebar holder 21 thereon mounting a handlebar 23. The holder 21 may angle up as shown in solid lines in FIG. 1, or down as shown in dashed lines for adjustment of handlebar height. Further adjustment is effected by sliding the holder 21 up or down on the stem 22.

A lock cylinder 32 is snugly fitted within the uppermost portion of the stem 22 and keyed thereto by a spring loaded pin 34. A lock shaft 36 is rotatably mounted within the lock cylinder 32 and retained therein by a retainer washer of standard design. Tumblers and grooves within the locking mechanism are provided in the usual manner. A key 38 is also provided and is shaped to line up the tumblers with the grooves to permit free rotation of the shaft within the cylinder while the key is fully inserted in the lock.

The lock shaft 36 extends within the stem 22 and into a stem insert 40. The insert 40 is fixedly attached to the inner surface of the stem 22 and is provided with a plurality of apertures. One such aperture 41 comprises an axial bore receiving the lock shaft 36. The lock shaft 36 has a shoulder 42 engaging the top of the insert 40 and the lower end of the shaft is of reduced diameter to fit the aligned aperture 41 in the insert 40. A still further reduced diameter neck or annular groove 44 is provided to cooperate with a pin 46 extending laterally through the insert 40 so as to stabilize the position of the lock shaft 36 within the insert 40.

A small eccentrically positioned protrusion or pin 48 is provided at the lower end of the lock shaft 36 to actuate a lock bolt 50 (see also FIG. 3). The lock bolt 50 is slidably mounted in an intersecting lateral aperture 51 in the insert 40 and is recessed on one side at 53 to cooperate with the pin or protrusion 48 as the lock shaft 36 is turned by the key 38. The top of the bolt 50 is flattened chordally at 55 for abutment by the lower flat end 59 of the shaft 36 to prevent rotation of the bolt about its axis. The lock bolt 50 is provided with a spring 52 and the end of the bolt 50 extends through a suitable aperture in the side of the stem 22.

An intermediate sleeve or bearing cup 54 (FIG. 5) is conventionally brazed or welded to the inner surface of the head 10 or may be splined or knurled and driven fixedly into place. This cup is illustrated as provided with knurling 45 and provided with a plurality of apertures 57 slightly larger than the lock bolt diameter. These apertures are positioned opposite the plane of rotation of the lock bolt 50 transverse of the shaft 36. The upper portion of the cup, as shown in FIG. 2, provides the lower seat for the bearing 24.

When the steering mechanism is in unlocked position, the protrusion 48 bears against the end wall of recess 53 of bolt 50 to retain the bolt within the confines of the stem 22 against the action of the spring 52. However, when the lock is turned to the locked position the protrusion is moved to a position to allow the spring 52 to urge the bolt laterally through the adjacent aperture in the stem 22 into one of the apertures in the sleeve or bearing cup 54. If none of the sleeve apertures is aligned with the stem aperture and bolt, the bolt is urged against the inner surface of the sleeve. Upon turning of the steering mechanism to a position of aperture alignment, the bolt will be urged into the aligned sleeve aperture whereby mechanically to key the sleeve portion to the stem. While the stem 22 is keyed to the sleeve 54, the bicycle cannot be steered and so cannot be ridden or easily be wheeled away. Furthermore, the stem assembly when in locked position cannot be disassembled and removed by a thief even when the handle bar and yoke have been removed.

The configuration of the locking bolt is such that upon rotation of the lock shaft to the unlocked position, the protrusion 48 will force the bolt 50 against the spring and out of the apertures whereby to free the stem for rotation within the tubular head 10 once more.

The pin 34 in the lock cylinder 32 is counterbored and carries a spring urging the pin out into a recess 59 in the upper portion of the stem 22. Accordingly, the bicycle can be supplied with a filler, as of plastic material, at the top of the stem, and the lock cylinder can be snapped into place when desired. The pin 34 may be depressed within the lock cylinder wall by a needle or the like, compressing the spring. The lock cylinder may then be withdrawn from the stem without shearing the pin 34.

The substantially flat sheet material part illustrated in FIG. 4 comprises a thin rectangular strip 56 integrally joined to a widened out portion 58. The strip portion 56 and the widened out portion 58 are both symmetrical about a common longitudinal axis and are perforated with a series of five circular apertures. One of these apertures 60 lies approximately in the center of the widened out portion on the centerline thereof. Two smaller apertures 62 and 64 are positioned further from the narrow strip portion 56 and are spaced symmetrically on opposite sides of the axis of the part. The sheet material is slotted at 65 along its center line from the aperture 60 to the widened out end of the part. Two more apertures 66 and 68 are centered on the axis of the narrow strip respectively near its ends. Between the apertures 66 and 68 lies a pair of stamped parallel ridges 67 and 69 extending longitudinally of the strip and spaced apart on opposite sides of the axis. Outwardly of the stamped ridges the strip portion 56 is knurled or provided with stamped ridges.

When the cycle steering mechanism is assembled the strip 56 is bent around the handle bar as at 71 in FIG. 1 so that apertures 66 and 68 are aligned. A bolt 73 is secured through apertures 66 and 68 and a nut 79 is tightened thereon to clamp the handle bar in position. The knurled strips grip the handle bar firmly while the stamped ridges 67 and 69 strengthen the structure. The widened out portion clamps the stem portion 22 and is bent upward and around the stem as at 75 so that apertures 62 and 64 are aligned, the stem passing substantially through aperture 60. The two legs of the widened out portion separated by slot 65 encircle the stem. Another bolt 77 is inserted through apertures 62 and 64 and a nut 81 thereon is drawn tight to clamp the stem securely in place.

The sheet metal construction described is light weight and more economical to produce than a cast handlebar holder. It grips the stem and handlebar firmly and possesses sufficient strength to perform its function. As the handlebar is turned the torque is transmitted through the handlebar holder to the stem and thence through the stem to the fork portions 18 and 20. The fork portions act through the front steering wheel to turn the cycle in the direction of movement of the handlebars. When in locked position the handlebar stem is prevented from moving relative to the head of the tubular frame and so can transmit no turning action from the handlebars to the front wheel.

Some cyclists like to have their handlebars relatively high, while others like them relatively low. This is readily taken care of by inverting the handlebar holder, hereinafter identified by the numeral 81, positioning it in either the solid line or dotted line position of FIG. 1. It is not possible to do this with the usual cast handlebar holder, particularly when made integral with the stem. Still other cyclists require a rather extreme height to the handlebars, and this is taken care of in the modification of FIG. 6. In FIG. 6, many of the parts are similar to those heretofore shown and described, and similar numerals are used with the addition of the suffix a. The stem 22a is the same as that previously described, but is provided above the tapered portion with internal threads 82. These internal threads receive external threads 84 of a tubular extension piece 86. The tubular extension piece has a depending portion 88 fitting within the upper end of the stem 22a, and has an enlarged upper portion 90 of the same external diameter as the upper portion of the stem 22a, joining the depending portion at an external shoulder 92. Preferably a set screw 94 is threaded through the upper portion of the stem 22a and abuts the depending portion 88 of the extension piece 86, whereby to resist the threaded retraction thereof from the fully seated position shown in FIG. 6. The handlebar holder or support 81 obviously could be secured to the top portion of the extension piece 86, if so desired, and the lock could be inserted in this top portion. However, provision is made for a still greater extension or elevation of the handlebars by means of yet another extension member 96. The extension member 96 is similar to the member 86, having threads 84' at the bottom portion thereof threadedly receivable in internal threads 98 in the first extension member 86. A set screw 100 is threaded through the side wall of the first extension 86 for engagement with the depending portion of the second extension 96, whereby to lock the parts together.

Obviously, any number of extensions such as 86 and 96 may be provided, with the handlebar holder 81 mounted at the top of the uppermost one thereof. As shown, the lock 32a is received at the top of the upper member. Obviously, a lock shaft 36a of substantially greater length than that of FIG. 2 is required to operate the locking bolt 50a.

In order to obviate the necessity of providing lock cylinders with depending shafts of different lengths, the embodiment of FIGS. 7–11 is provided. Thus, the lock cylinder 32b is provided with a very short depending shaft portion 102 of square, or other suitable non-circular shape. A tubular extension rod 104 is provided, having the upper end thereof of the same square or other non-circular shape as the stub shaft 102, as indicated at 106. At the bottom of the shaft extension 104, some of the material is cut away, and the remaining portion thereof is rolled into the form of a protuberance or pin 48b functionally similar to the pin 48, and co-acting with a lock bolt to operate the same. A groove 44a can be rolled into the tubular shaft if desired, as shown in FIG. 6, or can be omitted, as shown in FIG. 7.

In conjunction with the embodiment of FIGS. 7–11, an improved means is shown for holding the lock in place in the upper end of the stem, although this means is operable with either this modification, or with the original embodiment. In particular, the lock cylinder is provided along one or preferably on opposite sides with chordal flats 108. Cylindrical segments 110 are provided each of which is complementary to the lock cylinder 32b, fitting against the chordal flat 108 thereof. Each segment is provided with a radial pin 112 adapted to be received in an aperture 59b in the stem 22b. The radial pin preferably is in the form of an integral projection. Further, the aperture or apertures 59b can comprise a continuous internal annular groove. The snap ring 114 that holds the rotary portion of the lock within the mounting bushing thereof is of sufficient radial dimension as to underlie the segments 110.

Accordingly, when it is desired to install the lock, a shaft extension 104 of suitable length is fitted to the stub shaft 102. Each cylindrical segment 110 is installed with the pin 112 received in the groove or corresponding aperture 59b. A daub of adhesive readily holds each segment in place. The lock is then pushed into place with the snap ring 114 camming past the cylindrical segments, and snapping out under the segments, permanently to hold the lock in place. Should it be desired at some future date to remove the lock, the handlebar holder 81b is removed, and the pin 112 is drilled from the hole 59b.

As will be apparent, the modification of FIGS. 7–11 gives somewhat greater flexibility, and is low in cost. Used with the extensions of FIG. 6, substantially any desired handlebar height can be obtained.

The specific embodiments of the invention as herein shown and described are for exemplary purposes only. Various changes in structure will no doubt occur to those skilled in the art, and will be understood as coming within the purview of this invention, insofar as they fall within the spirit and scope of the appended claims.

I claim:

1. A steering lock mechanism for a tubular frame vehicle having a substantially upright tubular head portion, comprising a substantially vertical fork and tubular fork stem, means rotatably mounting said tubular fork stem in said tubular head portion, said tubular fork stem comprising a tubular member having a portion of predetermined larger diameter within said tubular head portion and having an integral portion upwards thereof of decreased internal diameter permanently fixed to said portion of large diameter, said tubular fork stem having an underlying enlargement including said fork preventing upward withdrawal of said tubular fork stem through said tubular head portion, latch means snugly fitting within the larger diameter portion of said tubular fork stem and too large to be withdrawn through said portion of decreased internal diameter, said latch means having a latch member reciprocable radially of said tubular fork stem, said tubular fork stem having an aperture therein through which said latch member is movable, means providing a strike in said tubular head portion with which said latch member is engageable for releasably locking said latch member to said tubular head portion, said latch member locking to said tubular fork stem by extending through the aperture therein whereby said tubular fork stem is releasably latched to said tubular head portion against rotation thereof, lock means received in the decreased diameter portion of said tubular fork stem, adjacent the upper end thereof, and means extending through said tubular fork stem and operatively interconnecting said lock means and said latch means for effecting reciprocation of said latch member between locking and unlocking position upon manipulation of said lock means.

2. A steering lock mechanism as set forth in claim 1 wherein the means operatively interconnecting the lock means and the latch means comprises a member detachably connected to the lock means and detachably connected to the latch member.

3. A steering lock mechanism as set forth in claim 2 wherein the member comprises a tube having a non-circular upper end, the lock means having a depending complementary non-circular member interfitting therewith, said tube having an eccentric axial projection at the lower end cooperable with the latch member for a longitudinal movement thereof.

4. A steering lock mechanism for a tubular frame vehicle having a substantially upright tubular head portion, comprising a substantially vertical fork and tubular fork stem, means rotatably mounting said tubular fork stem in said tubular head portion, said tubular fork stem comprising a tubular member having a portion of predetermined larger diameter within said tubular head portion and having an integral portion upwards thereof of decreased internal diameter permanently fixed to said portion of large diameter, said tubular fork stem portion of decreased internal diameter having an internally threaded upper end, said tubular fork stem having an underlying enlargement including said fork preventing upward withdrawal of said tubular fork stem through said tubular head portion, latch means snugly fitting within the larger diameter portion of said tubular fork stem and too large to be withdrawn through said portion of decreased internal diameter, said latch means having a latch member reciprocable radially of said tubular fork stem, said tubular fork stem having an aperture therein through which said latch member is movable, means providing a strike in said tubular head portion with which said latch member is engageable for releasably locking said latch member to said tubular head portion, said latch member locking to said tubular fork stem by extending through the aperture therein whereby said tubular fork stem is releasably latched to said tubular head portion against rotation thereof, a tubular extension of substantially the same internal diameter as said tubular fork stem portion of decreased internal diameter and having a lower externally threaded end threadedly received in said tubular fork stem to form a vertical extension thereof of substantially the same internal diameter as the tubular fork stem decreased internal diameter portion, lock means received in the tubular extension, adjacent the upper end thereof, and means extending through said tubular extension and tubular fork stem and operatively interconnecting said lock means and said latch means for effecting reciprocation of said latch member between locking and unlocking position upon manipulation of said lock means.

5. A steering lock mechanism as set forth in claim 1 wherein the lock means includes a cylindrical portion and a chordal flat thereon, and further including a cylindrical segment having a projecting pin, said cylindrical segment being received in the upper end of the steering post with the pin received in a lateral aperture, and said lock means cylindrical portion having a snap ring thereon extending radially out beneath the cylindrical segment and securing the lock means in the steering post.

6. A steering lock mechanism for a tubular frame vehicle having a substantially upright tubular head portion, comprising a substantially vertical steering post, means rotatably mounting said steering post in said tubular head portion, said steering post comprising a tubular member having a portion within said tubular head portion and having a second portion upwards thereof, said steering post having an underlying enlargement preventing upward withdrawal of said steering post through said tubular head portion, latch means snugly fitting within the lower portion of said steering post, said latch means having a latch member reciprocable radially of said steering post, said steering post having an aperture therein through which said latch member is movable, means providing a strike in said tubular head portion with which said latch member is engageable for releasably locking said latch member to said tubular head portion, said latch member locking to said steering post by extending through the aperture therein whereby said steering post is releasably latched to said tubular head portion against rotation thereof, lock means received in the upper portion of said steering post and including a generally cylindrical bushing having a chordal flat thereon and having a lock cylinder rotatable therein, a cylindrical segment complementary to said bushing and having a radial pin extending therefrom, said steering post having a radial aperture receiving said pin, said lock means further including a snap ring locking said lock cylinder rotatably within said bushing and extending radially out beneath said cylindrical segment and retaining said bushing in said steering post, and means extending through said steering post and operatively interconnecting said lock cylinder and said latch means for effecting reciprocation of said latch member between locking and unlocking position upon manipulation of said lock means.

7. A steering lock mechanism for a tubular frame vehicle having a substantially upright tubular head portion, comprising a susbtantially vertical steering post, means rotatably mounting said steering post in said tubular head portion, said steering post comprising a tubular member having a portion within said tubular head portion and having a second portion upwards thereof, said steering post having an underlying enlargement preventing upward withdrawal of said steering post through said tubular head portion, latch means snugly fitting within the lower portion of said steering post, said latch means having a latch member reciprocable radially of said steering post, said steering post having an aperture therein through which said latch member is movable, means providing a strike in said tubular head portion with which said latch member is engageable for releasably locking said latch member to said tubular head portion, said latch member locking to said steering post by etxending through the aperture therein whereby said steering post is releasably latched to said tubular head portion against rotation thereof, at least one steering post extension releasably secured to the upper end of said steering post and extending axially upwards thereof, lock means received in the upper end of said steering post extension, and means extending through said steering post and extension and operatively interconnecting said latch means and said lock means for effecting reciprocation of said latch member between locking and unlocking position upon manipulation of said lock means.

8. A steering lock mechanism for a tubular frame vehicle having a substantially upright tubular head portion, comprising a substantially vertical steering post, means rotatably mounting said steering post in said tubular head portion, said steering post comprising a tubular member having a portion within said tubular head portion and having a second portion upwards thereof, said steering post having an underlying enlargement preventing upward withdrawal of said steering post through said tubular head portion, latch means including a base member snugly fitting within the lower portion of said steering post, said latch means having a latch member reciprocable radially of said steering post, said steering post having an aperture therein through which said latch member is movable, means providing a strike in said tubular head portion with which said latch member is engageable for relasably locking said latch member to said tubular head portion, said latch member locking to said steering post by extending through the aperture therein whereby said steering post is releasably latched to said tubular head portion against rotation thereof, lock means received in the upper portion of said steering post and including a depending non-circular projection, a lock shaft extension tube having a non-circular upper end complementary to and receiving the non-circular projection and having at the lower end an eccentric projection operatively interconnected with the latch means for effecting reciprocation of said latch member between locking and unlocking position upon manipultaion of said lock means, said lock shaft at the upper end being positioned by said lock means and being rotatably journalled at its lower end in said latch means base member and being substantially unsupported in between.

References Cited in the file of this patent

UNITED STATES PATENTS

| | | |
|---|---|---|
| 1,195,619 | Smith | Aug. 22, 1916 |
| 1,987,735 | Falk | Jan. 15, 1935 |
| 2,303,241 | Taman | Nov. 24, 1942 |